(12) United States Patent
Carmichael

(10) Patent No.: US 11,165,525 B2
(45) Date of Patent: Nov. 2, 2021

(54) RADIO RECONFIGURATION AND RECORDING

(71) Applicant: Connie Jordan Carmichael, Laguna Niguel, CA (US)

(72) Inventor: Connie Jordan Carmichael, Laguna Niguel, CA (US)

(*) Notice: Subject to any disclaimer, the term of this patent is extended or adjusted under 35 U.S.C. 154(b) by 0 days.

(21) Appl. No.: 16/539,954

(22) Filed: Aug. 13, 2019

(65) Prior Publication Data
US 2020/0067620 A1 Feb. 27, 2020

Related U.S. Application Data

(60) Provisional application No. 62/721,478, filed on Aug. 22, 2018.

(51) Int. Cl.
*H04H 60/13* (2008.01)
*H04B 1/00* (2006.01)
*H04N 21/462* (2011.01)
*G06F 16/635* (2019.01)
*G06F 16/68* (2019.01)
*G06F 16/65* (2019.01)
*H04N 21/435* (2011.01)

(52) U.S. Cl.
CPC ........... *H04H 60/13* (2013.01); *G06F 16/637* (2019.01); *G06F 16/65* (2019.01); *G06F 16/68* (2019.01); *H04B 1/0057* (2013.01); *H04N 21/435* (2013.01); *H04N 21/4622* (2013.01)

(58) Field of Classification Search
CPC ........ H04H 60/27; H04H 60/40; H04H 60/16; H04H 60/17; H04H 60/13; H04H 2201/60; H04H 40/00
See application file for complete search history.

(56) References Cited

U.S. PATENT DOCUMENTS

| | | | | |
|---|---|---|---|---|
| 2006/0241798 A1* | 10/2006 | Watanabe | ............ | G11B 27/105 700/94 |
| 2014/0335834 A1* | 11/2014 | Emerson, III | ........ | G06F 16/683 455/414.1 |
| 2015/0301692 A1* | 10/2015 | Patsiokas | ................. | H04N 5/76 715/716 |
| 2016/0360019 A1* | 12/2016 | Ellis | ........................ | H04H 20/71 |

* cited by examiner

*Primary Examiner* — Keith Ferguson
(74) *Attorney, Agent, or Firm* — Law Office of Scott C Harris, Inc

(57) ABSTRACT

A radio recorder app which uses reconfiguration of radio software to operate the radio to carry out various functions. The radio software can record either current information or information which is airing in the future. Once recorded, the radio software automatically catalogs the information to find songs in the information to find used on artist name and song name, and beginning of the end of the song. Thereafter, users can skip songs, or delete songs, or replay songs.

7 Claims, 1 Drawing Sheet

RADIO RECONFIGURATION AND RECORDING

This application claims priority from provisional application Ser. No. 62/721,478, filed Aug. 22, 2018, and entitled Radio Reconfiguration and Recording, the entire contents of which are herewith incorporated by reference.

BACKGROUND

Radios receive audio and play the audio over a speaker. Original radios were analog and received the content over the air by radio broadcasts. However, radio now has a wider connotation, to include anything that can receive audio content over a channel and play that audio. Accordingly, many mobile devices, such as automobiles and the like may have both analog and digital tuners as well as internet based tuners for radio.

SUMMARY OF THE INVENTION

Conventional radios play what they receive at the moment they receive it, in real time. The present application describes a digital recorder for radio. The digital recorder becomes part of the software image used to operate the radio. The software image is reconfigured under control of a user to carry out a function desired by the user.

DETAILED DESCRIPTION

An embodiment describes a digital recorder for analog, digital and internet based radio that allows received audio information to be recorded, catalogued, edited and played back.

It is well-established that the recording of information received over a channel is conventionally considered "fair use" and therefore allowed under copyright laws.

Figure 1:
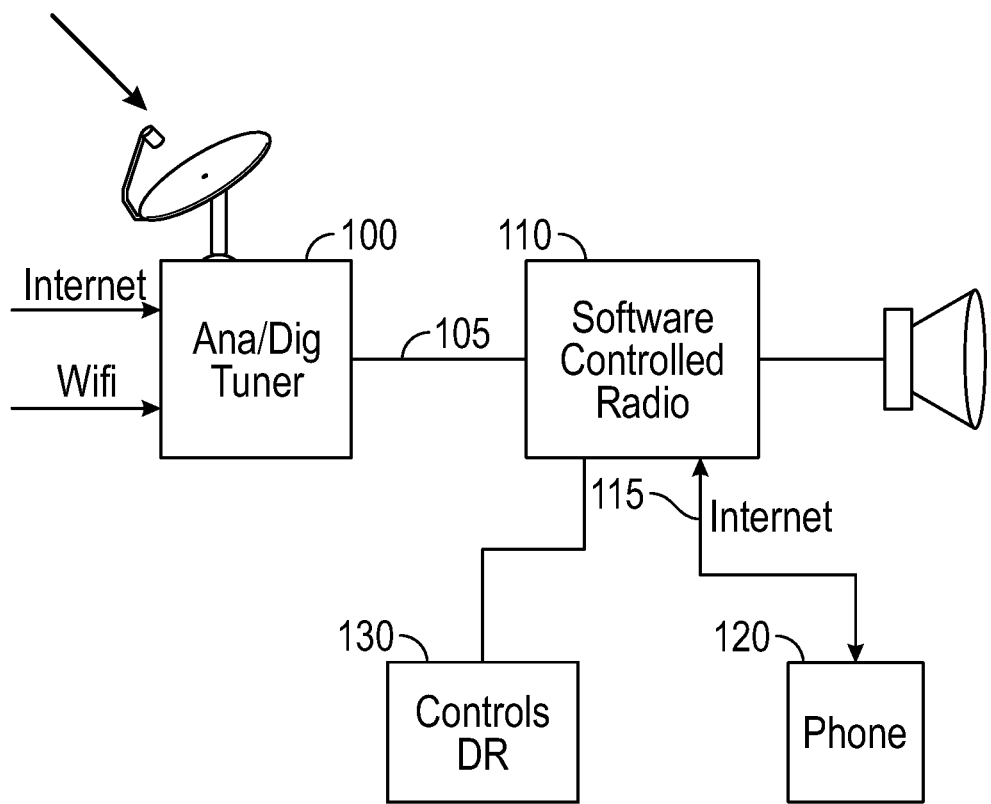
FIG. 1 shows a block diagram of an embodiment.

Modern radios, and especially those in moving conveyances such as automobiles, typically will have a tuner 100 as shown in FIG. 1 which may be either or both an over the air broadcast receiver, and may also be a digital tuner that receives information over Internet and Wi-Fi. In a preferred embodiment, the digital tuner can receive all of over the air content, Internet-based content, Wi-Fi content. The output 105 of the tuner represents information that has been received. The information received is coupled to a software controlled radio, which may be hardware and software which is run according to a software program. In one embodiment, for example, this can use reconfigurable logic such as field programmable gate arrays (FPGAs) or digital signal processors or just a programmed microprocessor. The software controlled radio also communicates over the Internet 115 to either a mobile phone 120 or server. The phone 120 is used to send/control software information which controls the configuration of the radio.

The radio interfaces with a control set 130, which may include user interfaces, and controls to control the radio. The radio can also be controlled from the phone 120.

Figure 2:
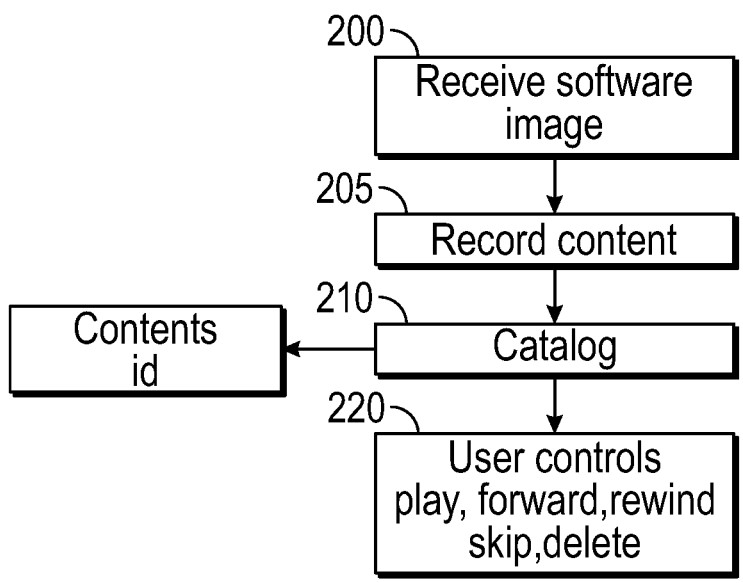
FIG. 2 shows a flowchart of operation.

In an embodiment, the radio 110 is controlled to operate according to the flowchart of FIG. 2. The radio 110 can receive a software image, either a full software image or a partial software image which only changes a part of the existing software, over the wireless channel 115, under control of the phone 120. Each time the user wants to change something about the radio, they download a different part or whole software image. Different functions of the radio are thus controlled by downloading new software kernels to the radio, so that the radio become software controlled.

The system receives a software image at 200 in FIG. 2. The software image can be changed relative to other software images to instruct the radio to carry out various functions. In the embodiment described herein, the software image tells the radio to record specified content. For example, this may instruct the radio to record the program that is going to play on a specified station or channel for the next 2 hours, at 205, and to catalog that program at 210. The cataloging can use publicly available music databases, for example, such as the "shazam" database, to identify the content that has been recorded and use that identification as part of the cataloging. For example, each "song" that is recorded can be correlated against the music database, to find the name and artist. The beginning and end of the song is identified, e.g., by comparing with the database. The catalog thus stores the time (beginning/end) of the song, and the name and artist.

At 220, the user controls the playback stream. This can be done, for example, by reading the contents of the catalog 210, and intelligently recording the way those contents are output. The playing can include play all, play a song, fast-forward, skip to the specified content, go back or other play controls. The user can listen live to the radio stream of over the air radio, listed to Internet radio, or radio via wireless, cable, virtual reality or augmented reality. The user controls can also allow deleting specified content, such as deleting parts of the program that the user does not like. The user can edit out songs for example, or edit out talking between songs.

The recording of content at 205 can be current recordings in one embodiment. In an embodiment, the user can schedule a later program or schedule to record recurring programs to allow the users to record future programs for example.

In one embodiment, this device can be used in any moving environment, such as automobiles, airplanes, watercraft, subways, trains, onboard computers, and the like. This can also be used, however, in other electronics such as smart T,V cable TV equipment, and other wireless and Internet enabled device.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. A radio device, comprising:
a radio tuner, receiving audio based information over a wireless channel, and converting the audio based information into a specified signal; and
a radio module, formed of a system that records the audio based information, connected to receive the specified signal from the radio tuner, and running a software image, which causes the radio module to record a specified time period of the audio based information, and to accept a command which causes the information which is recorded to be played back at a time later than a time of recording, wherein the radio module receives a new software image which causes the radio module to carry out a new operation, wherein the new operation comprises recording at a new time.

2. The device as in claim 1, wherein the radio module includes a cataloging function, finding each of a plurality of songs in the audio based information automatically, and cataloging the songs in the recorded information, including finding automatically a song name, and artist name, and a time when the song begins and ends in the recorded information.

3. The device as in claim 2, wherein the radio module accepts a control to skip a specified song, and automatically begins playing at the beginning of a next song.

4. The device as in claim 1, wherein the radio module accepts controls to carry out all of play, fast-forward, rewind, skip a song and go to the beginning of the next song, and delete the current song.

5. The device as in claim 1, wherein the radio tuner receives all of over the air radio information, and Internet radio information.

6. A radio recording device, comprising:

a radio tuner, receiving audio based information over a wireless channel, and converting the audio based information into a specified signal, wherein the radio tuner receives all of over the air radio information, and Internet radio information;

a processor, formed of a system that records the audio based information, connected to receive the specified signal from the radio tuner, and running a program which records a specified time period of the audio based information, to form recorded audio information;

wherein the processor catalogs the recorded audio information, by finding, for each of a plurality of songs in the recorded audio information, a song name, an artist name, and a time when a song begins and a time when the song ends in the recorded audio information;

and wherein the processor allows playing the recorded audio information, wherein the processor allows skipping a song to a next song in the recorded audio information, wherein the processor allows deleting a song within the recorded audio information, wherein the processor receives a new software image which causes the radio module to carry out a new operation, and wherein the new operation comprises recording at a new time.

7. The device as in claim 6, wherein the processor allows recording a current audio information, allows recording future audio information occurring at a specified time, and allows recording recurring programs.

* * * * *